United States Patent
Gradischnig et al.

(10) Patent No.: US 6,711,250 B1
(45) Date of Patent: Mar. 23, 2004

(54) MANAGEMENT COMPONENT OF A SIGNALLING TRANSFER POINT

(75) Inventors: Klaus Gradischnig, Gauting (DE); Hanns Schwarzbauer, Gröbenzell (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/674,952

(22) PCT Filed: May 4, 1999

(86) PCT No.: PCT/DE99/01336

§ 371 (c)(1),
(2), (4) Date: Nov. 8, 2000

(87) PCT Pub. No.: WO99/66693

PCT Pub. Date: Dec. 23, 1999

(51) Int. Cl.$^7$ ................................................ H04M 7/00
(52) U.S. Cl. ......................... 379/221.1; 379/112.01; 379/112.03; 379/114.08
(58) Field of Search ................. 379/112.01, 114.08, 379/112.03, 221.1, 229

(56) References Cited

U.S. PATENT DOCUMENTS

| | | | |
|---|---|---|---|
| 4,704,724 A | * 11/1987 | Krishnan et al. | 379/221.07 |
| 5,282,244 A | 1/1994 | Fuller et al. | |
| 5,581,610 A | 12/1996 | Hooshiari | |

FOREIGN PATENT DOCUMENTS

| | | |
|---|---|---|
| CA | 2153281 | 1/1996 |
| WO | WO 95/01063 | 1/1995 |

* cited by examiner

Primary Examiner—Ahmad F. Matar
Assistant Examiner—Rasha S Al-Aubaidi
(74) Attorney, Agent, or Firm—Neifeld IP Law, P.C.

(57) ABSTRACT

Operators of transfer points in the signalling network number 7 wish, on the one hand, to protect themselves against unauthorized use; on the other hand, these operators want to require fees for the use of the STP. The present invention solves this demand in a simple way in that it unites MTP charging with incoming linkset/DPC (desination point code) screening such that the accounts and their respective sub-accounts could be managed according to the evaluations of the covered traffic.

6 Claims, 2 Drawing Sheets

An account is established for each network in the STP. The selection of the account ensues with the linkset on which the MSU is obtained. Further, each account has four sub-accounts, one for each destination network that is determined on the basis of the DPC.

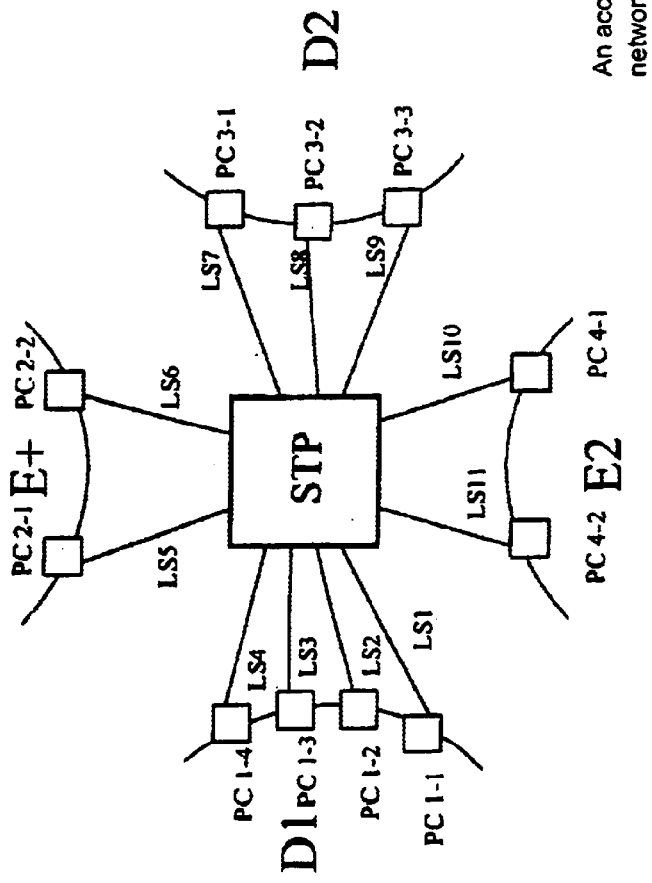
Figure 1 - Exemplary Application, Page 1, Network Confirguration
An account is established for each network in the STP. The selection of the account ensues with the linkset on which the MSU is obtained. Further, each account has four sub-accounts, one for each destination network that is determined on the basis of the DPC.

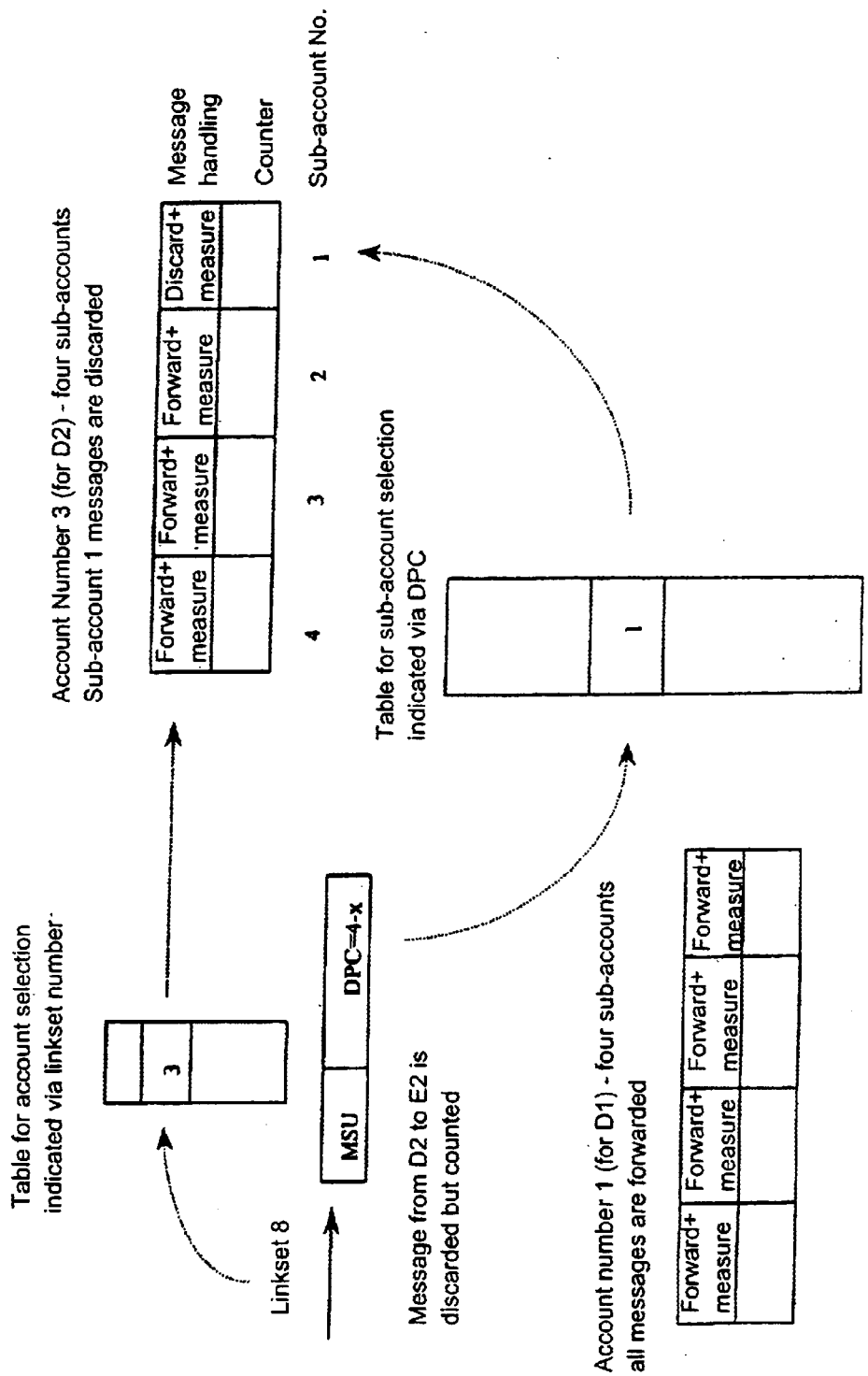
Figure 2 - Exemplary Application, Page 2, Tables

MANAGEMENT COMPONENT OF A SIGNALLING TRANSFER POINT

BACKGROUND OF THE INVENTION

1. Field of the Invention

The present invention relates generally to signaling in or between telecommunication networks, and in particular to common channel signaling systems.

2. Description of the Related Art

Operators of transfer points in the signalling network number 7 (signalling transfer points, STP) wish, on the one hand, to protect themselves against unauthorized use, i.e. to allow the use of the STP only on the basis of certain agreements and on the other hand, to charge fees for the use of the STP.

The document, U.S. Pat. No. 5,282,244 (Fuller et al.) discloses the implementation of the functions "screening" and "measurement" for signalling messages.

The following methods have formerly been applied for the implementation of these functions in the standards: a) In the Q.705, §8, MTP (Message transfer part of SS7 Protocol) screening on the basis of OPC/DPC (Originating Point Code/Destination Point Code) incoming linkset/DPC is defined in that an OPC/DPC matrix defines the allowed or banned traffic relationships. Furthermore, there are demands made of the screening in STP that go beyond this, i.e., in Bellcore (GR-82-CORE, Appendix C). No object model has been defined for this screening by ITU, which makes a standardized management of these functions more difficult or, impossible.

Measurements (payments/billing) and a pertinent object model for the charge calculation of the traffic are defined in recommendations Q.752 and Q.751.3. This is based on a cascading principle wherein the immediately adjacent transmitter (operator of the neighboring node) pays fees to the operator of the STP. The neighboring transmitter is thereby identified on the basis of the incoming linkset, whereby a group of incoming linksets can definitely be combined into an account when a plurality of neighboring nodes are operated by the same operator and the traffic deriving from them need not be differentiated in greater detail.

On the other hand, the operator of the STP himself incurs charges, presumably by forwarding messages to other STP.

This fact is taken into consideration in that the operator of the STP may presumably require different fees for different destinations that are identified by the DPC in the transferred messages. Normally, the possible DPC are divided into DPC groups for this purpose and the traffic sent from a neighboring operator to these DPC groups is separately measured, i.e. there are sub-accounts for each defined account.

The cited recommendations thereby assume that these DPC groups are identical for all neighboring operators, i.e. that each account has the same sub-accounts. This, of course, does not preclude that specific sub-accounts of the different accounts are charged differently in a post-processing. For one network operator, for example, the traffic covered on a specific sub-account could be cost-free, whereas another must pay fees for the traffic covered on the same sub-account. This restriction on identical sub-accounts is in fact practical and desirable from the point of view of an efficient realization, but is not absolutely necessary and is also of no significance for the present invention. For the sake of completeness, it should also be mentioned that the cited recommendations also define mesurements for verification of billing charges.

SUMMARY OF THE INVENTION

The invention is based on the object of realizing the charging and the screening in an STP in a simple and dynamically beneficial way.

This object is achieved by the management component of the signaling point. The management component allocates inquiries into various groups based upon a selection criteria. Once an inquiry satisfies the selection criteria, it is then forwarded to a designated group. The management is useable by a plurality of operators.

Furthermore, a handling component of the signaling point routes a message of each specific group according to a criteria identical for all other messages of that specific group. The criteria used for routing the messages has two components, namely; a traffic measurement and a screening function. This handling component (arrangement) comprises a plurality of other handling components that are respectively uniquely useable by the operators.

BRIEF DESCRIPTION OF THE DRAWINGS

FIG. 1 illustrates an exemplary network configuration that applies the present invention.

FIG. 2 illustrates a block diagram that shows an exemplary application of the signaling point according to the present invention.

DETAILED DESCRIPTION OF THE PREFERRED EMBODIMENTS

The invention is explained in greater detail below.

The invention is based on the concept that traffic that is to be charged a fee should often also be similarly screened. This perception can also be inventively converted in a simple way in realization-oriented terms. Accordingly, the present invention unites MTP charging with incoming linkset/DPC screening such that determinations can still be made for each account and for each of its sub-account regarding what is to be done with the traffic needed to be covered. Possible procedures are, for example, counting and forwarding (corresponds to the previous fee charging), counting (measuring) and discarding (corresponds to incoming linkset/DPC screening with simultaneous measurement of illegal traffic), forwarding or discarding.

A The object model contained in Q.751.3 can be expanded for this purpose with few additions. The slight changes that are required in the Q.751.1 are reflected in the realization of this type of incoming linkset/DPC screening when the charging is already realized i.e., in EWSD. Compared to the charging, only a slight additional dynamic load results. The critical realization-oriented costs are in the administration of the data and in offering the access procedures, which are (practically) identical here, namely; screening and charging. Just about the same is true of the dynamic outlay. In contrast, an implementation strictly according to Q.705 requires substantial additional expenses.

An exemplary modification of the MTP accounting object model in Q.751.3 for realizing the invention is presented below. The proposed modifications are in italics and underlined.

1) Modification of the mtpAccountPackage

```
mtpAccountPackage PACKAGE
BEHAVIOUR mtpAccountPackageBehavious BEHAVIOUR DEFINED AS
    "The mtpAccount managed object allows by means of the signLinkSetTpSet attribute to
    define a set (at least one) of signLinkSetTps which are leading to an adjacent operator and
    therefore their MSU traffic can be accounted/verified collectively. One signLinkSetTp must
    not be assigned to more than one mtpAccountPackage instance within on mtpSignPoint. All
    signLinkSetTpSets of mtpAccounts with the same operatorName value must be disjunct.
    The selectionItem in each of th entries of selectionGroupSet refers each to one instance of
    dpcGroup, the optionalSelectionItem can be used to refer one instance of siGroup. Each
    selectiongroup entry shall be unique in this attribute. The optionalReactionItem can be used
    to specify the reaction if the selection criteria is met ("count", "discard",
    "count+discard", "pass", ...)
    For each selectionGroup it is counted separately. Each counter information contains the
    number of MSUs, the number of octets and an eventual data problem. The counter are not
    readable but only available in the notification data.
    If all counters for verification or accounting should still be zero at the end of the
    measurement, the corresponding notification should be generated regardless of that in order
    to provide a measure against notification loss.
    Two different notifications, one for accounting, one for accounting verification containing the
    measurement results might be generated by this one object. If a selectionGroupSet is empty,
    then this means, that accounting resp. verification is not performed for the adjacent
    operator. In this case there is not notification for accounting resp. verification.";;
ATTRIBUTES
    mtpAccountId GET SET-BY-CREATE,
    signLinkSetTpSet GET SET-BY-CREATE ADD-REMOVE,
    operatorName GET SET-BY-CREATE,
    selectionGroupSetForAccounting GET REPLACE ADD-REMOVE;
    selectionGroupSetForVerification GET REPLACE ADD-REMOVE;
NOTIFICATIONS
        MTPaCCOUNTING,
    mtpAccountingVerification;
REGISTERED AS {mtpAccountPackage-POi};
```

2) No Modification of the SelectionGroupSetForAccounting Attributes

```
selectionGroupSetForAccounting ATTRIBUTE
WITH ATTRIBUTE SYNTAX AccountingDefinedTypesModule,SelectionGroupSet;
MATCHES FOR EQUALITY:
BEHAVIOUR selectionGroupSetForAccountingBehaviour BEHAVIOR DEFINED AS
    "The selection GroupSetForAccounting attribute refers to set of groups of object instances
    that are representing the items against which incoming SS7 traffic should be registered.";;
REGISTERED AS {selectionGroupSetForAccounting-AOi};
SelectionGroupSet ::= SET SIZE (0 . . . maxNumberReferencesInSelectionGroupSet) OF SelectionGroup
```

3) Required Modification of the SelectionGroup Type

```
SelectionGroup ::= SEQUENCE
{
selectionItem              [0] ObjectInstance,
optionalSelectionItem      [1] ObjectInstance OPTIONAL,
optionalReactionItem       [2]Reaction Type OPTIONAL
}
```

4) Example for Definition of the ReactionType Type

```
ReactionType ::=ENUMERATED
{
    passOn            (0),
    count             (1),
    discard           (2),
    chargeAndDiscard  (3),
    ...}
or
```

-continued

```
Reaction Type ::=BITSTRING
{
count              (0),
discard            (1),
- - - the reaction is activated, if the corresponding
bit is set
}
```

FIGS. 1 and 2 show an exemplary application wherein an operator (for example, D1) offers Internetwork-STP services to a plurality of other network operators (for example, D2, E+, E2). Accordingly, D1 should interact with all other networks, and D2 should interact with D1 and E+,and E+ should interact with D1 and D2, and E2 should only interact with D1. Furthermore, the ensuing traffic. The traffic that is thereby forwarded should also be charged depending on the destination network.

Although other modifications and changes may be suggested by those skilled in the art, it is the intention of the inventors to embody within the patent warranted hereon all changes and modifications as reasonably and properly come within the scope of their contribution to the art.

What is claimed is:

1. A management component of a signaling point, comprising:

means for allocating incoming messages of said signaling point to groups of messages, wherein each message in the same group of messages has the same designated selection feature, said means for allocating includes means for defining said designated selection feature for each respective group that each message must satisfy in order to qualify for allocation to said respective group; and a handling arrangement that handles all messages within said same group of messages similarly by utilizing a traffic measurement and a screen function.

2. A management component according to claim 1, wherein said defined designated selection feature relates to a linkset through which a message should arrive and said defined designated selection feature relates to at least one destination point code set to which a destination point code of a message should belong.

3. A management component according to claim 1, wherein said management component is useable by a plurality of operators, and wherein said handling arrangement comprises a plurality of handling components respectively uniquely useable by said operators.

4. A management component according to claim 1, wherein said management component is devised based on an enhancement of message transfer part of a signaling system 7 account model of International Telecommunication Union Q751.3, said enhancement comprising of a corresponding reaction item for screening.

5. A signaling point, comprising:

an allocation component that allocates an incoming message to a defined designated group of messages based on features of said defined designated group;

a handling component that handles all messages of said defined designated group similarly;

a management component that determines said features by which a group is defined, said management component determines for said handling component manner and way of handling messages by utilizing a traffic measurement and a screen function.

6. A method for routing a message in a signaling point, comprising the steps of:

allocating, via an allocation component of said signaling point, said message to a defined group of messages on a basis of features of said defined designated group;

handling, via a handling component of said signaling point, all messages of said defined designated group in a similar way and manner, determining said features of said defined designated group by management component of said signaling point, and determining said way and manner via said management component of said signaling point, wherein said manner and way comprises a traffic measurement and screening function.

* * * * *

UNITED STATES PATENT AND TRADEMARK OFFICE
CERTIFICATE OF CORRECTION

PATENT NO.     : 6,711,250 B2
DATED          : March 23, 2004
INVENTOR(S)    : Gradischnig et al.

It is certified that error appears in the above-identified patent and that said Letters Patent is hereby corrected as shown below:

<u>Title page,</u>
Insert after item [87] and before item [51] the following:
-- [30]    Foreign Application Priority Data
May 8, 1998 (DE) .........................198 20 689.5 --

Signed and Sealed this

Eleventh Day of May, 2004

JON W. DUDAS
*Acting Director of the United States Patent and Trademark Office*